(12) United States Patent
King

(10) Patent No.: US 6,734,807 B2
(45) Date of Patent: *May 11, 2004

(54) POLARAMETRIC BLIND SPOT DETECTOR WITH STEERABLE BEAM

(75) Inventor: Joseph David King, Hudson, NH (US)

(73) Assignee: Lear Automotive Dearborn, Inc., Southfield, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/283,035

(22) Filed: Apr. 1, 1999

(65) Prior Publication Data

US 2002/0011926 A1 Jan. 31, 2002

(51) Int. Cl.[7] ................................................. G08G 1/16
(52) U.S. Cl. ...................... 340/903; 340/435; 340/436; 340/901; 340/902; 340/904
(58) Field of Search ................................. 340/903, 901, 340/904, 425.5, 435, 436, 437

(56) References Cited

U.S. PATENT DOCUMENTS

| | | | | |
|---|---|---|---|---|
| 4,156,874 A | * | 5/1979 | Kopis | 343/7 |
| 4,500,977 A | * | 2/1985 | Gelhard | 367/108 |
| 4,694,295 A | | 9/1987 | Miller et al. | 340/903 |
| 5,173,881 A | * | 12/1992 | Sindle | 367/101 |
| 5,227,807 A | * | 7/1993 | Bohlman et al. | 343/895 |
| 5,264,859 A | * | 11/1993 | Lee et al. | 343/754 |
| 5,574,426 A | * | 11/1996 | Shisgal et al. | 340/435 |
| 5,583,495 A | * | 12/1996 | Ben Lulu | 340/904 |
| 5,786,772 A | * | 7/1998 | Schofield et al. | 340/903 |
| 6,005,511 A | * | 12/1999 | Young et al. | 342/70 |
| 6,198,449 B1 | * | 3/2001 | Muhlhauser et al. | 343/753 |

FOREIGN PATENT DOCUMENTS

| | | | |
|---|---|---|---|
| FR | 2257095 | | 7/1974 |
| GB | 2048600 | | 10/1980 |
| GB | 2265744 | | 6/1993 |
| GB | 2265744 A | * | 10/1993 |
| GB | 2273015 | | 1/1994 |

* cited by examiner

Primary Examiner—Daniel J. Wu
Assistant Examiner—Son Tang
(74) Attorney, Agent, or Firm—Bill C. Panagos

(57) ABSTRACT

A blind spot detection system includes a transmitter directing a circularly polarized signal into a blind spot adjacent a vehicle. A receiver also mounted on the vehicle receives a reflection of the circularly polarized signal which is oppositely circularly polarized. An indicator indicates to the driver of the vehicle when the reflected signal is detected, thereby indicating the presence of an object in the blind spot. An indicator is also directed toward the blind spot generating a warning when the presence of an object in the blind spot is detected and an indication of a turn or lane change by the vehicle is detected, such as turn signal switch activation.

16 Claims, 2 Drawing Sheets

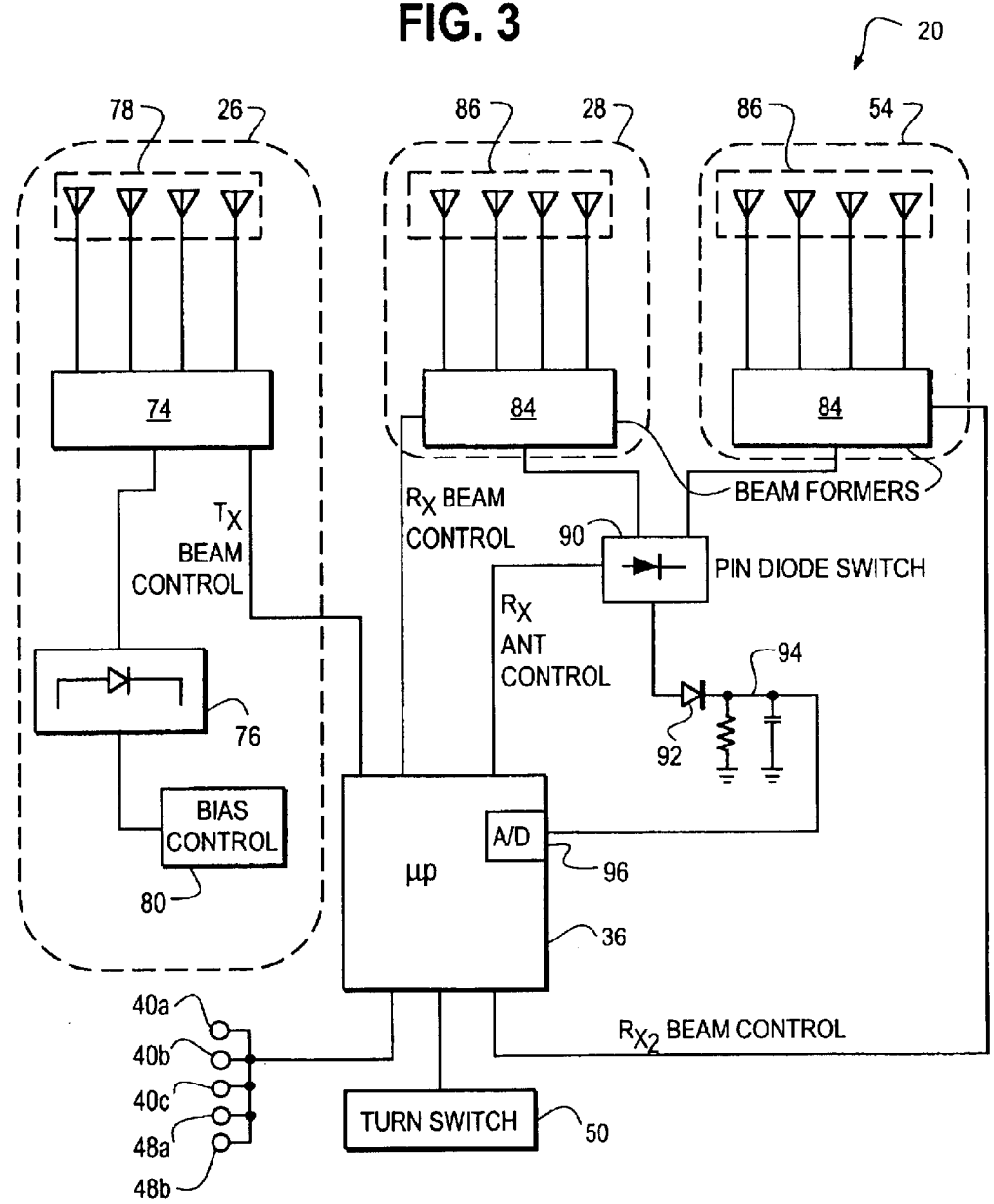

POLARAMETRIC BLIND SPOT DETECTOR WITH STEERABLE BEAM

BACKGROUND OF THE INVENTION

The present invention relates generally to collision avoidance systems or blind spot detectors and more particularly to a blind spot detector utilizing polarametric transmitters with steerable beams.

Known collision avoidance systems including blind spot detectors are known to include a transmitter which transmits a signal into the blind spot and a receiver which receives a reflected signal from an object in the blind spot. Upon receiving the reflected signal, the blind spot detector indicates to the driver that a vehicle or other object is located in the blind spot.

For example, when a vehicle is about to change lanes, the collision avoidance system indicates to the driver that another vehicle is adjacent the driver's vehicle. Other collision avoidance systems detect the presence of an object to the rear of the vehicle, such as when the vehicle is in reverse. Currently known blind spot protectors are expensive in order to provide reliable indications of the presence of an object in the blind spot.

SUMMARY OF THE INVENTION

The present invention provides a collision warning system or "blind spot detection system" utilizing circularly polarized transmitters and receivers. The blind spot detection of the present invention provides accurate and reliable indications of the presence of objects (such as nearby vehicles) at low cost.

The blind spot detection system generally includes a transmitter and antenna system which generates a circularly polarized signal into the blind spot. A receiver, also mounted on the vehicle, receives a reflection of the circularly polarized signal. Upon reflection of the circularly polarized signal from a conducting object (such as a vehicle) the polarity of the reflected signal is reversed. The receiver includes a circularly polarized antenna which is polarized opposite the polarization of an antenna of the transmitter. When the receiver receives a signal with the correct circular polarization, it is determined that an object is present in the blind spot.

In a preferred embodiment, the transmitter generates a steerable signal which the transmitter sweeps along a horizontal plane to increase the coverage of the blind spot. In addition, the transmitter sweeps in a vertical plane to discriminate an adjacent object (i.e., to discriminate between a vehicle and a guard rail). If a vehicle is detected in the blind spot, an indication is provided to the driver, such as an audible warning and/or visual indicator, such as a light.

The system also preferably provides a warning to an adjacent vehicle. Preferably, a visual indicator, such as a light mounted in the side view mirror, is illuminated when the presence of the vehicle in the blind spot is detected and there is an indication (such as a turn signal switch activation) that the first vehicle is going to change lanes.

The blind spot detector could also be directed toward the rear of the vehicle to detect obstacles while the vehicle is in reverse. Similarly, it could be directed in front of the vehicle for low visibility situations, such as dense fog.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 3 is a more detailed schematic of the blind spot detection system of FIG. 1.

DETAILED DESCRIPTION OF A PREFERRED EMBODIMENT

Figure 1:
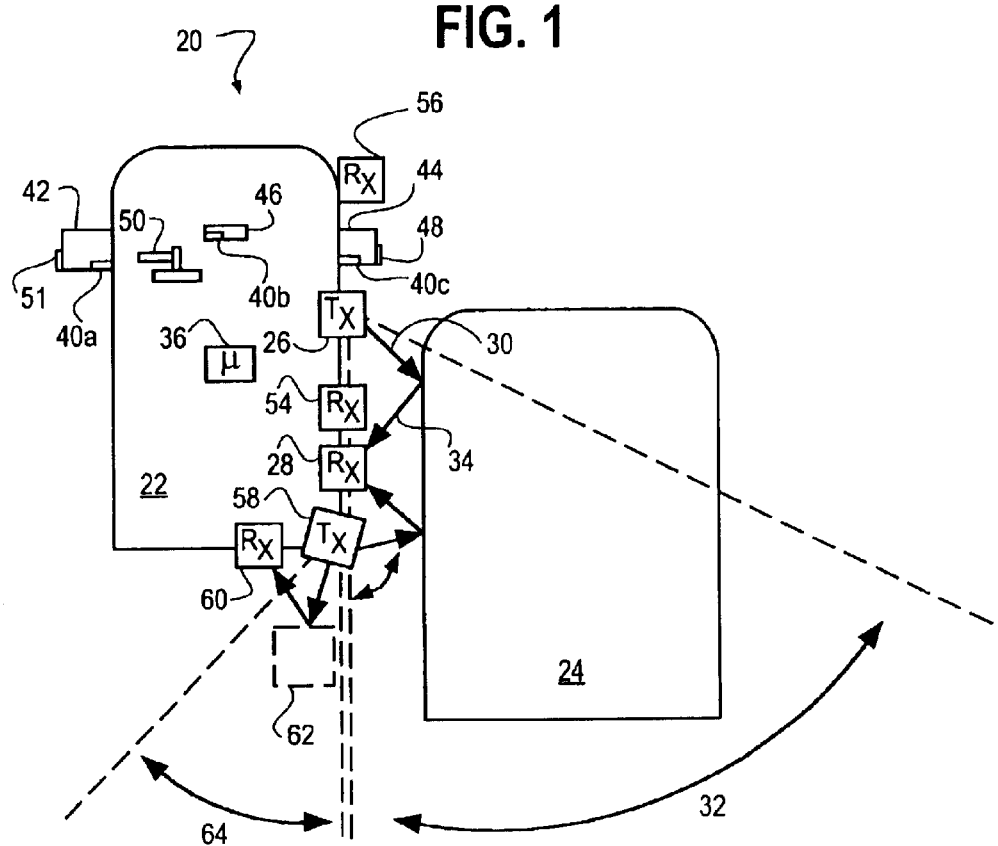
FIG. 1 is a schematic plane view of a blind spot detection system of the present invention.

A blind spot detection system 20 of the present invention is illustrated schematically installed on a vehicle 22 in FIG. 1 to indicate the presence of an adjacent object 24, such as a vehicle. It should be understood that the system 20 will be described with respect to the right hand side of the vehicle 22, but identical transmitters and receivers would be located on the left hand side as well. The blind spot detection system 20 includes a first transmitter 26 mounted on the vehicle 22 and a first receiver 28 mounted on the vehicle 22, and longitudinally spaced from the first transmitter 26.

The first transmitter 26 generates a circularly polarized signal 30 into a blind spot 32. If the circularly polarized signal 30 encounters a conductive boundary, such as the object 24, a reflection 34 of the circularly polarized signal 30 will be received by the receiver 28. The reflection 34 will be circularly polarized in an opposite polarization to that of the circularly polarized signal 30 from the first transmitter 26. For example, if the circularly polarized signal from the first transmitter 26 is right hand circular polarization, the reflection 34 would be left hand circular polarization, and vice versa. Creating and receiving the proper polarization for the transmitter and receiver is a function of the polarization of the antennas utilized, which is well within the skill in the art.

The first transmitter 26 is controlled by a microprocessor 36, also mounted on the vehicle 22 (all connections not shown for simplicity). The first receiver 28 sends a signal to the microprocessor 36 when the reflection 34 is received. When the microprocessor 36 determines that the object 24 is present in the blind spot 32, the microprocessor 36 activates indicators 40a–c, which are mounted in the side view mirrors 42, 44 and interior rear view mirror 46. Indicator 40a would preferably indicate the presence of an object in a blind spot on the driver's side of the vehicle 22, while indicator 40c would indicate the presence of an object 24 in the blind spot 32 on the passenger side of the vehicle 22. Indicator 40b would indicate the presence of an object 24 to the rear of the vehicle 22.

The system 20 preferably further includes an indicator 48 which is visible from the blind spot 32. The indicator 48 provides a warning to any vehicle in the blind spot 32 when the presence of the object 24 is determined to be in the blind spot 32 and it is determined by the microprocessor 36 that the vehicle 22 is about to change lanes. Preferably this is done by monitoring activation of the turn signal switch 50. Thus, when the presence of an object 24 is detected in the blind spot 32 and the turn signal switch 50 is activated in that direction, the indicator 48 is activated, providing a warning to a driver of the vehicle in the blind spot 32. An identical indicator 51 is provided on the left side of the vehicle 22.

Preferably, the gain, loss and frequency of the circularly polarized signal 30 and angles between the first transmitter 26 and the first receiver 28 ensure that the blind spot detection system 20 only determines the presence of objects 24 in the blind spot 32 within a certain range. For example, it is desirable that these parameters be chosen to ensure that the indicator 40c indicates the presence of an object 24 in an adjacent lane, but not two or three lanes away.

Preferably, the transmitter 26 provides a steerable circularly polarized signal 30, in which case it may desirable to add a second receiver 54 spaced from the first receiver 28. The system 20 may further include a third receiver 56 mounted forward of the first transmitter 26 to increase the range of the blind spot detection system 20 even further.

Optionally, a second transmitter 58 may be mounted at a rear corner of the vehicle 22. The second transmitter 58 is utilized together with a fourth receiver 60 mounted at the rear of the vehicle 22 to provide detection of a rear object 62 in a rear blind spot 64. Preferably, the second transmitter 58 is also steerable, in which case the second transmitter 58 may also be utilized in conjunction with the first receiver 28 to also provide detection of the object 24 in the blind spot 32.

Figure 2:
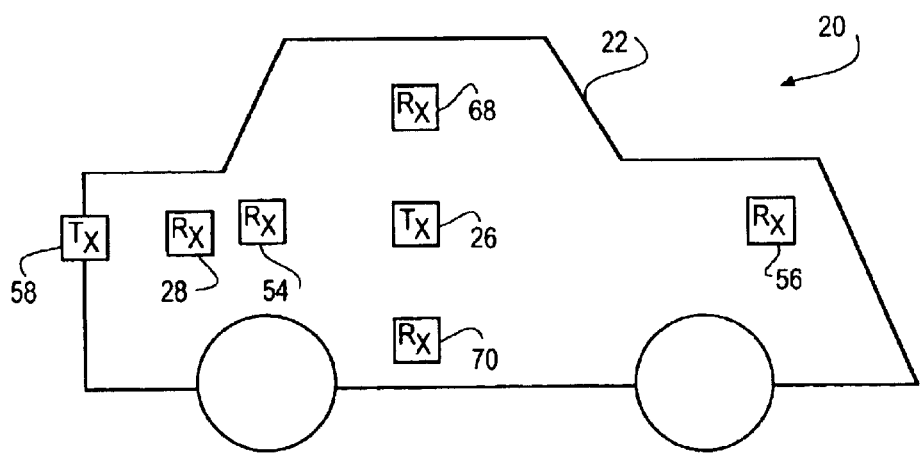
FIG. 2 is a schematic side view of the blind spot detection system of FIG. 1.

FIG. 2 illustrates the arrangement of the transmitters 26, 58 and receivers 28, 54, 56 on the passenger side of the vehicle 22. As can also be seen in FIG. 2, the blind spot detection system 20 can also be provided with vertically spaced receivers, including an upper receiver 68 mounted above the transmitter 26 and a lower receiver 70 mounted below the transmitter 26. A steerable beam from the transmitter 26 is swept in the vertical direction to discriminate adjacent objects. For example, by sweeping in the vertical plane, the blind spot detection system 20 can discriminate between a vehicle and a guardrail.

A more detailed schematic of a blind spot detection system 20 shown in FIGS. 1 and 2. FIG. 3 illustrates only the first transmitter 26. The second transmitter 58 would be connected to the microprocessor 36 identically. Similarly, only receivers 28 and 54 are illustrated. Receivers 56, 60 would be connected identically.

The first transmitter 26 includes a beam former 74, such as phase shifters, microstrip or Rotman lens. The beam former 74 receives an oscillating signal from an oscillator 76, such as a Gunn diode in a substrate cavity. The signal from the beam former 74 is transmitted via an antenna array 78. In a known manner, the beam former 74 shifts the phases of antennas 78 to steer the transmitted signal, which in this case is the circularly polarized signal 30 (FIG. 1). A biased control circuit 80 receiving an input from the microprocessor 36 controls the frequency and magnitude of the signal, while the microprocessor 36 directly controls the steering of the beam from the transmitter 26. The antenna array 78, beam former 74 and oscillator 76 could all be made into a single microstrip component in a known manner.

Each receiver 28, 54 includes a beam former 84 and antenna array 86. The signal received by receivers 28 and 54 is selectively received via a diode switch 90 and detected by a detector 92 having a filter 94. The signal from the selected receiver (receiver 28 or receiver 54) is sent to the microprocessor 36 via an analog-to-digital converter 96. The microprocessor 36 directly controls the phase shift of each of the antennas 86 of each of the receivers 28, 54 and the selection of which signal will be received by the analog-to-digital converter 96.

The microprocessor 36 also receives input from the turn signal switch 50 and selectively illuminates indicators 40a–c and 48a–b according to the conditions described herein.

The antennas arrays 78, 86 of FIG. 3 may be linear arrays, providing the ability to sweep the signal in a horizontal direction. The antenna arrays 78, 86 may comprise planar arrays, thus also providing the ability to sweep in the vertical direction. Receivers 68 and 70 (FIG. 2) would also be connected to the microprocessor 36 in an identical fashion.

The blind spot detection system of the present invention provides accurate and reliable detection of an object in the blind spot 32, 64. The components described herein, including all of the components shown in FIG. 3, are extremely low cost, particularly compared to existing blind spot detection systems.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A blind spot detector for a vehicle comprising:

a transmitter for generating a circularly polarized signal into a blind spot to the rear of the vehicle, said transmitter being circularly polarized in a first direction; and a receiver for receiving a reflection of said circularly polarized signal, said reflection being circularly polarized opposite said circularly polarized signal and said receiver being circularly polarized in a second direction opposite to the first direction, said blind spot detector being for detecting the presence of an object in the blind spot based upon said receiver receiving said reflection when the vehicle is operating in reverse.

2. The blind spot detector of claim 1 wherein said transmitter selectively steers said circularly polarized signal and sweeps said circularly polarized signal across the blind spot.

3. The blind spot detector of claim 2 wherein said transmitter sweeps said circularly polarized signal generally horizontally generally parallel to a longitudinal axis of the vehicle.

4. The blind spot detector of claim 2 wherein said transmitter sweeps said circularly polarized signal generally vertically generally perpendicularly to a longitudinal axis of the vehicle.

5. The blind spot detector of claim 4 wherein said transmitter sweeps said circularly polarized signal generally horizontally generally parallel to a longitudinal axis of the vehicle.

6. The blind spot detector of claim 1 wherein said transmitter includes a circularly polarized antenna of opposite circular polarization of a circularly polarized antenna of said receiver.

7. The blind spot detector of claim 1 further including an indicator indicating the presence of the object in the blind spot based upon said receiver receiving said reflection.

8. The blind spot detector of claim 7 wherein the indicator is visible to another vehicle located in the blind spot.

9. A method for detecting the presence of an object to the rear of a vehicle, said method including the steps of:

a) generating a circularly polarized signal into a spot to the rear of the vehicle using a transmitter circularly polarized in a first direction;

b) receiving a reflection of said circularly polarized signal using a receiver circularly polarized in a second direction opposite to the first direction, said reflection being circularly polarized opposite said circularly polarized signal; and c) detecting the presence of the object in the spot based upon step b) when the vehicle is operating in reverse.

10. The method of claim 9 further including the step of indicating the presence of the object to a driver of the vehicle based upon said step c).

11. The method of claim 9 further including the step of directing an indication of the presence of the object in the spot toward the spot.

12. The method of claim 11 further including the step of generating a visible warning to an adjacent vehicle in the spot based upon said step c).

13. The method of claim 9 wherein said transmitter selectively steers said circularly polarized signal and sweeps said circularly polarized signal across the spot.

14. The method of claim 13 wherein said transmitter sweeps said circularly polarized signal generally horizontally generally parallel to a longitudinal axis of the vehicle.

15. The method of claim 13 wherein said transmitter sweeps said circularly polarized signal generally vertically generally perpendicularly to a longitudinal axis of the vehicle.

16. The method of claim 15 wherein said transmitter sweeps said circularly polarized signal generally horizontally generally parallel to a longitudinal axis of the vehicle.

* * * * *